(12) United States Patent
Burkatovsky

(10) Patent No.: US 7,525,670 B1
(45) Date of Patent: Apr. 28, 2009

(54) DISTANCE AND ORIENTATION MEASUREMENT OF AN OBJECT

(75) Inventor: Vitaly Burkatovsky, Rishon le Zion (IL)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 12/060,926

(22) Filed: Apr. 2, 2008

(51) Int. Cl.
G01B 11/24 (2006.01)
G01N 21/86 (2006.01)

(52) U.S. Cl. ............ 356/614; 356/139.04; 250/559.18; 250/227.21

(58) Field of Classification Search ............ 356/139.04, 356/601, 608–609, 614, 445; 250/559.16, 250/559.18, 559.19, 559.24, 227.21
See application file for complete search history.

(56) References Cited

U.S. PATENT DOCUMENTS

| | | | |
|---|---|---|---|
| 4,739,161 A | 4/1988 | Moriyama et al. | |
| 4,801,799 A | 1/1989 | Tromborg et al. | |
| 5,017,772 A | 5/1991 | Hafle | |
| 5,418,361 A * | 5/1995 | Pinnock et al. | 250/227.21 |
| 5,742,068 A * | 4/1998 | Dybdahl et al. | 250/559.19 |
| 5,988,862 A * | 11/1999 | Kacyra et al. | 703/6 |
| 6,407,817 B1 * | 6/2002 | Norita et al. | 356/608 |
| 6,825,484 B2 * | 11/2004 | Burkatovsky | 250/559.18 |
| 7,071,460 B2 | 7/2006 | Rush | |
| 2005/0174584 A1 * | 8/2005 | Chalmers et al. | 356/630 |
| 2006/0290920 A1 * | 12/2006 | Kampchen et al. | 356/139.04 |
| 2007/0279590 A1 * | 12/2007 | Ebisawa | 351/208 |

* cited by examiner

*Primary Examiner*—Sang Nguyen
(74) *Attorney, Agent, or Firm*—Nelson Adrian Blish

(57) ABSTRACT

A method for measuring a distance between an object (256) and a light source (230) and sensing an object orientation includes applying light from a plurality of sources (230, 240 or 810) on the object; detecting a reflected energy (270) level from an object; measuring the reflected energy level from the object; computing a distance calibration function; determining at least one measuring range (301) indicated by a minimum value (302) and a maximum value (304) within the distance calibration function; computing an angle calibration function indicating energy level relation sampled at predetermined time slots within periods of a modulation function; and modulating each of the plurality of light sources with the modulation function (435, 445) such that a total energy applied from the plurality of light sources on the object during the time of the light emission is represented by a light emission predetermined function.

15 Claims, 10 Drawing Sheets

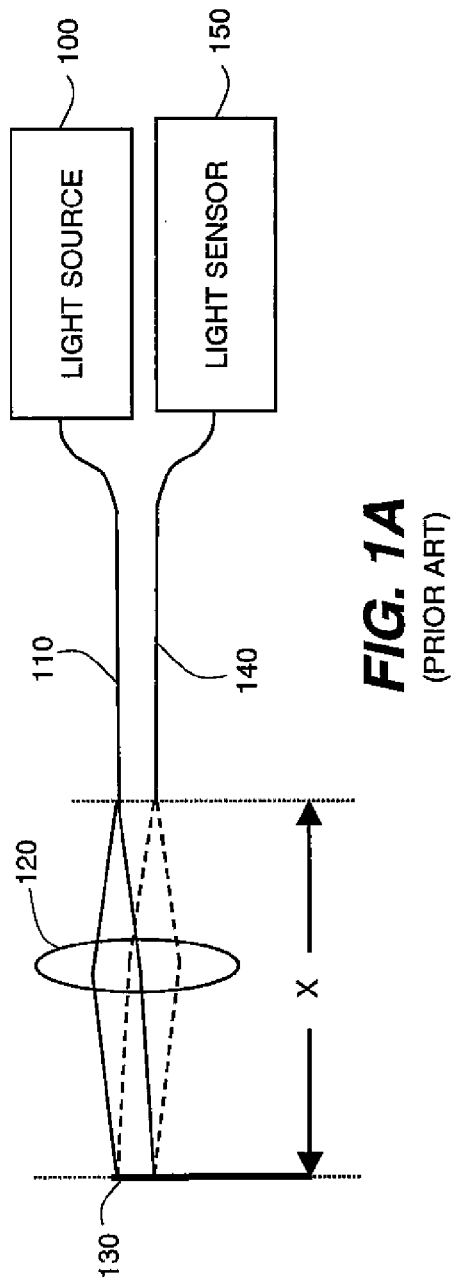
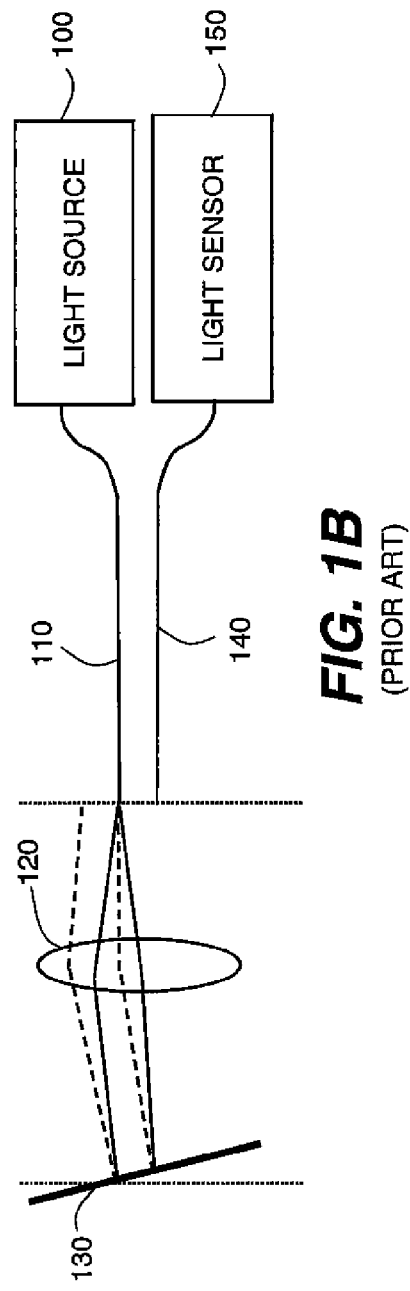
FIG. 1A
(PRIOR ART)
FIG. 1B
(PRIOR ART)

DISTANCE AND ORIENTATION MEASUREMENT OF AN OBJECT

FIELD OF THE INVENTION

This invention relates to an optical sensor and methods for non-contact measuring of a distance and orientation of a surface and more particularly for measurement using a fiber optics displacement sensor.

BACKGROUND OF THE INVENTION

Contactless distance measurements are widely used in the industry. Different technologies are deployed, dependant on the specific application needs. Technologies such as laser triangulation, confocal, fiber based, interferometer, and chromatic are common in the field of distance or displacement measurement, and are implemented by using optical methods. Each of the technologies are chosen to fit specific application requirements. For example, some of the computer-to-plate (CTP) imaging machines use the laser triangulation principle in order to focus the imaging head. One of the drawbacks of such a sensing device is the relatively high cost and form factor aspects, which impose substantial imaging head design constraints.

Another method of non-contact displacement measurement allowing small sensor dimensions is disclosed in U.S. Pat. Nos. 7,071,460 (Rush); 4,739,161 (Moriyama et al.); 5,017,772 (Hafle); and 4,801,799 (Tromborg et al.). All the disclosed patents use two or more optical fibers for measuring the distance to the media. Each of the patents disclosed are based on a predetermined media orientation in respect to the sensor. For applications where media orientation is not predetermined, for example, computer-to-plate (CTP) head calibration, such an assumption is not valid and it is impossible to accurately measure the distance to arbitrary oriented media.

FIG. 1A shows the functionality of a sensor according to U.S. Pat. No. 4,801,799, with media 130 oriented at a 90 degree angle to the sensor optical axis. FIG. 1B shows media 130 oriented at an angle other than 90 degrees. In both cases, the distance between media 130 and the outlet of the optical fiber 110 is identical.

It is apparent from FIG. 1A that the light coming from the light source 100 through fiber 110 and lens 120 is reflected back from media 130, which is oriented perpendicular with respect to the fiber light emission axis, and returns through lens 120 and fiber 140 to the light sensor circuitry 150. In this case the quantity of the reflected light energy detected by the light sensor 150 is a function of media-to-fiber outlet distance. (See FIG. 4 of U.S. Pat. No. 4,801,799.)

FIG. 1B shows the sensor functionality with a tilted orientation of media 130. In this case the light sensor 150 will receive smaller amounts of the reflected light energy or none at all. As it can be seen from FIG. 1B even a slight change in the media 130 orientation angle might lead to the deviation of light sensor 150 output signal even though the distance between the media and the fiber outlet does not change. In other words the media 130 orientation angle may significantly change the light sensor 150 output signals thus increasing the measuring errors or making measurements impossible.

In head-to-media distance measurement applications, the orientation or shape of the surface, or head to sleeve distance measurement, often varies. In those cases the fiber sensor errors caused by media orientation or shape variances becomes a substantial disadvantage of the measurement sensor. Additionally, imaging head alignment deviations or sleeve or drum eccentricity changes are also affect media-to-sensor distance measurements.

SUMMARY OF THE INVENTION

An object of this invention is to provide a new and improved optical fiber displacement sensor device capable of providing measurements between sensor and non-flat shape surfaces or flat surfaces positioned within the range of angles between the surface and sensor axis.

Briefly, according to one aspect of the present invention a method for measuring a distance between an object and a light source and sensing an orientation of the object includes applying light from a plurality of light sources on the object; detecting a reflected energy level from an object; measuring the reflected energy level from the object; computing a distance calibration function indicating the relation to the distance between the object and the light source; determining at least one measuring range indicated by a minimum value and a maximum value within the distance calibration function; computing an angle calibration function indicating energy level relation sampled at predetermined time slots within periods of a modulation function; and modulating each of the plurality of light sources with the modulation function such that a total energy applied from the plurality of light sources on the object during the time of the light emission is represented by a light emission predetermined function.

The light sensor response signal measured at any fixed time within the modulation period T is a function of media-to-fiber distance and the present invention provides for measuring distance between the media and sensor even at the case where media is oriented at other than a 90 degree angle with respect to the optical fiber sensor light emission axis, or the media having a non-flat shape. The distance is determined by the light sensor response, measured at a fixed and predetermined point of modulation period, while angle direction and value is determined by a phase and amplitude of the signal.

In the case wherein the media is oriented perpendicular with respect to the light emission axis, then the sum of the emitted light measures will stay constant, regardless of the type of modulated or un-modulated light sensor response, which is a function of the media-to-fiber distance. In the case wherein the media is positioned non-perpendicular in respect to the light emission axis or has a non-flat shape, then the measured light sensor output signal will become modulated, and the phase and amplitude of this signal will point to the direction and value of the deflection angle respectively. Other advantages of the invention will become apparent from the following description and drawings.

BRIEF DESCRIPTION OF THE DRAWINGS

FIGS. 1A and 1B are schematics of prior art illustrating sensor functionality;

DETAILED DESCRIPTION OF THE INVENTION

Figure 2A:
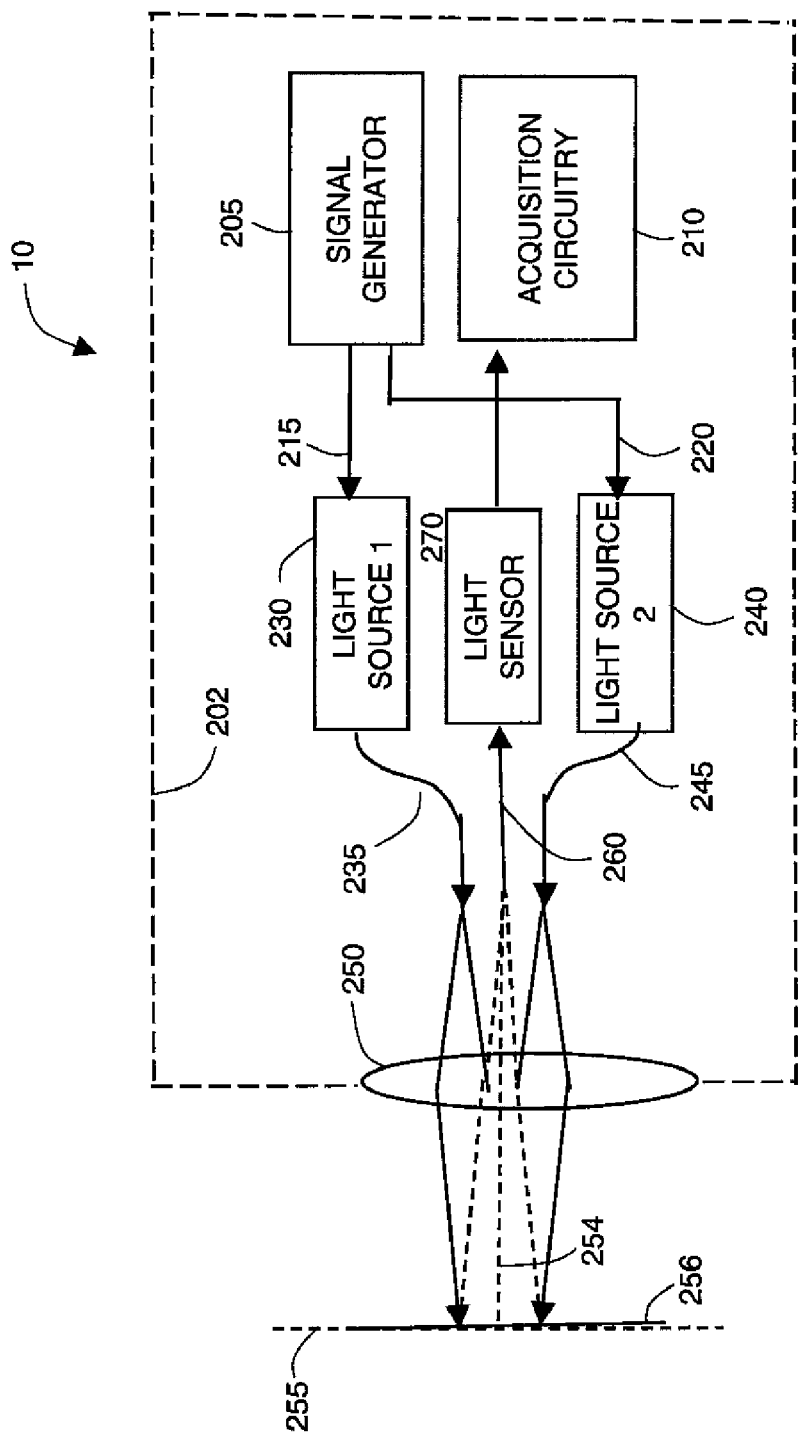
FIGS. 2A-2C are schematics illustrating sensor functionality of the invention.
Figure 2B:
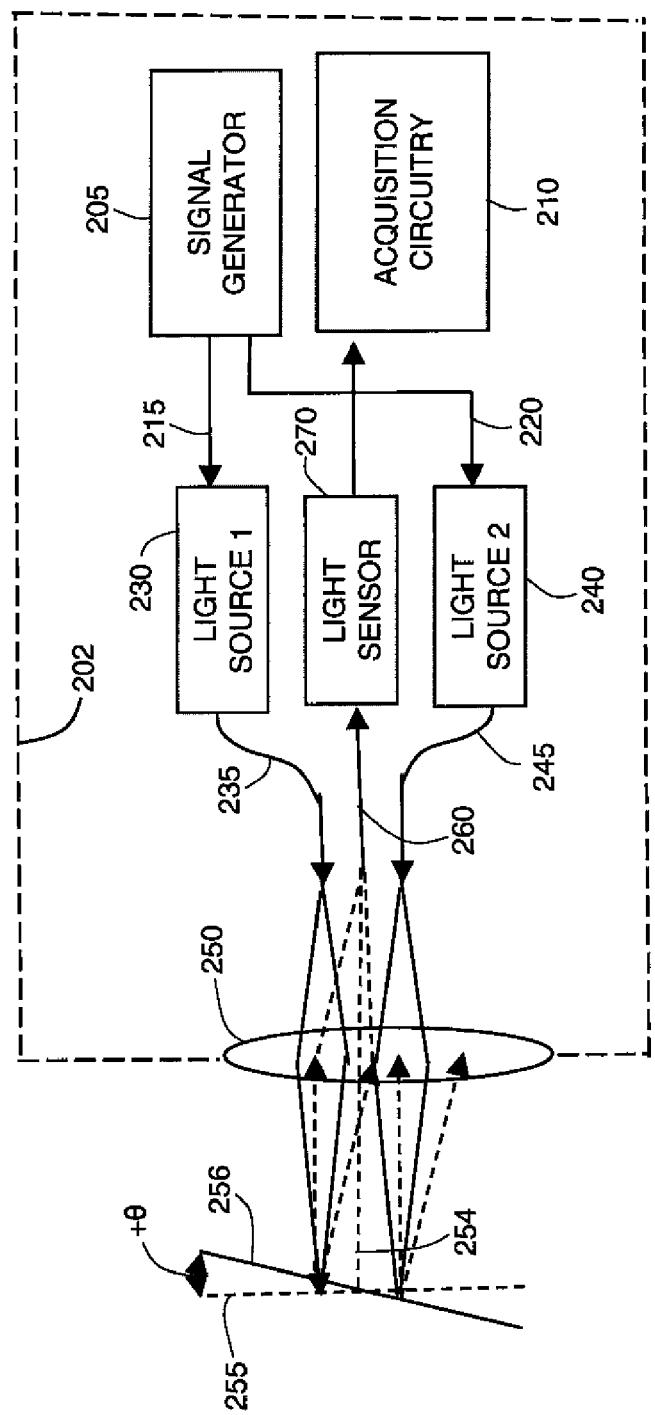
Figure 2C:
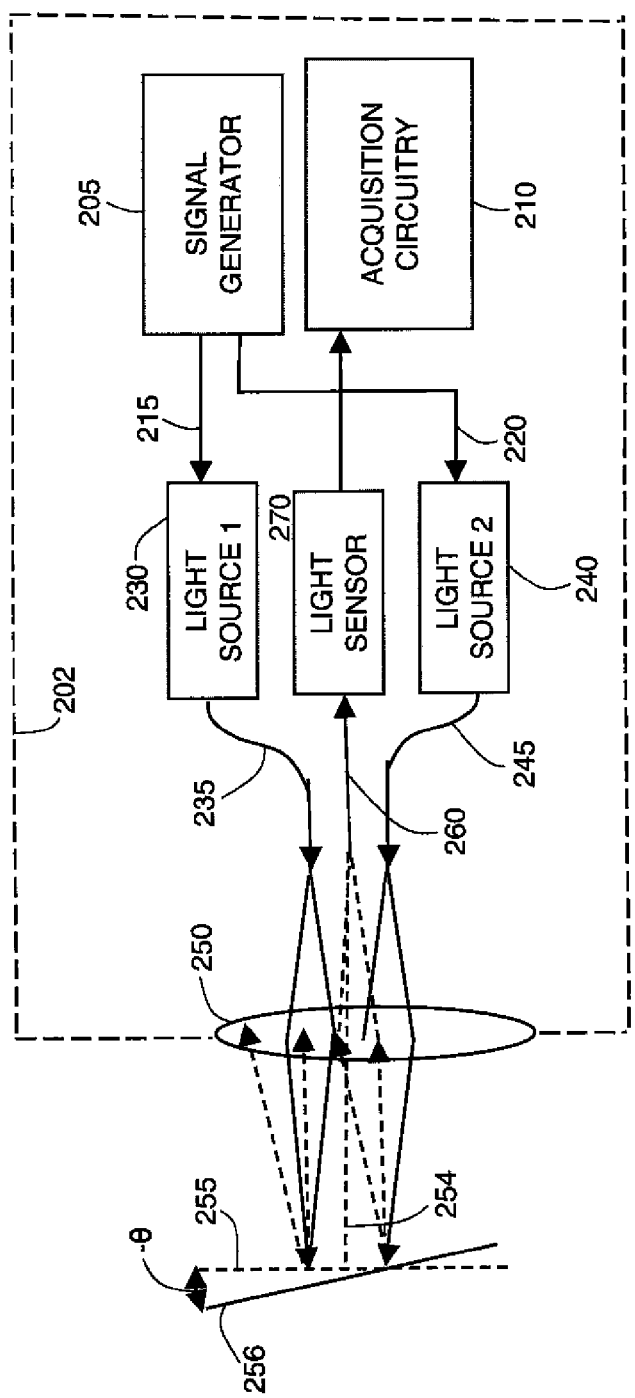

FIGS. 2A-2C are a schematic representations of optical fiber displacement apparatus according to the present invention, referred to in general by numeral 10. Optical fiber displacement apparatus 10 consists of signal generator 205, which generates control signals 215 and 220 for providing light modulation of light source 230 and light source 240. Optical fibers 235 and 245 conduct light from the light sources 230 and 240 respectively. Lens for focus light beams comes from optical fibers 235 and 245 on media 256, and light sensor 270 measures the reflected light from media 256 coming through the lens 250 and the optical fiber 260. The reflected light through light sensor 270 is acquired by the acquisition circuitry 210 and analyzed. Sensor configuration might comprise more than two emitting fibers and the single light sensor 270.

The signal generator 205 issues control signals 215 and 220 for light sources 230 and 240 respectively. For example, the light sources can utilize laser diodes. The control signals deliver electrical current which stimulates the energy emitted for each of the light sources. The emitted light energy related to the linear range of the light source characteristic is proportional to the light source current. To summarize, the emitted light from each of the light sources will change according to the respective light source current modulation function.

Figure 4A:
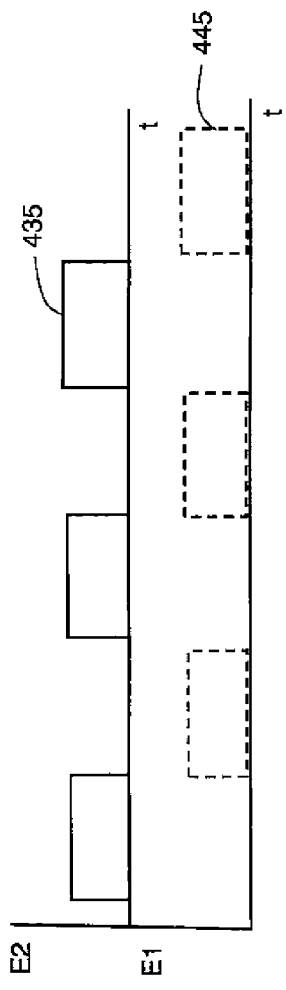
FIGS. 4A-4C are timing diagrams illustrating various types of modulations.

Let us assume that light energy E1 of the light source 230 is pulse modulated as it is shown in FIG. 4A represented by function 445 (dashed). The light energy E2 of the light source 240 is modulated by the similar pulses of the same amplitude and same duty cycle of 50%, but shifted by the length of one pulse (half a period) as is shown in FIG. 4A by function 435.

The total light energy EΣ emitted from both light sources 230 and 240 for each modulation period may be written as follows:

$$E_\Sigma = \int_0^{0.5T} E_1(t)dt + \int_{0.5T}^{T} E_2(t)dt = E_1 + E_2 \quad (1)$$

And the light emitted power respectively will be:

$$P_\Sigma = \frac{E_\Sigma}{T} = \frac{E_1 + E_2}{T} = \frac{E_1}{0.5T} = \frac{E_2}{0.5T} = const \quad (2)$$

Equation (2) shows that the modulation signal described above provides a constant light power when it reaches the surface of the media.

In the event media 256 is oriented perpendicularly in respect to the emitted light axis as is depicted in FIG. 2A, the portions of the reflected light returning to the light sensor 270 through the lens 250 and the optical fiber 260 are equal due to the system symmetry. The reflection angle and power losses of each laser beam are equal, and the total reflected light power which is acquired by sensor 270 will stay constant as well. This is represented in Equation (3) below:

$$P_S = kP_1 = kP_2 = const \quad (3)$$

wherein k represents the reflection coefficient. In other words, despite the fact that each light source power is modulated, the reflected power measured by sensor 270 will show a constant value during the light source modulation described above.

Figure 3:
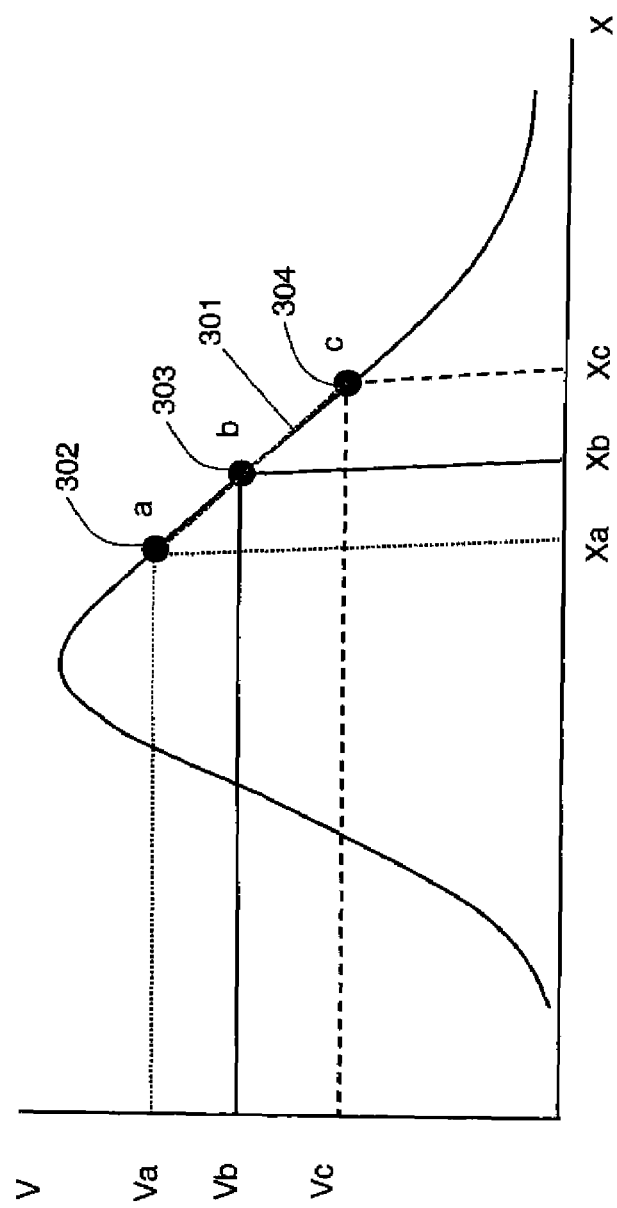
FIG. 3 is a schematic illustrating a media to fiber distance response calibration function.

It is well known in the industry that the constant power which is emitted from the light source and passed through the optical fiber being reflected from a perpendicularly oriented media and returned through the other optical fiber to the light sensor is a function of media to light source distance. The graphical representation of such a function is shown in FIG. 3, wherein the light sensor response, for example, is introduced by voltage signal V and the distance to media is introduced by X. Practically the linear range 301 of V=f(X) characteristic should be used. As an example three points; point a 302, point b 303, and point c 304, are related to the linear range 301. As it can be seen the distances Xa, Xb, and Xc are represented by respective sensor response Va, Vb, and Vc, wherein the Xa is the minimum distance detectable within the linear range and the Xc is the maximum distance respectively.

Figure 5:
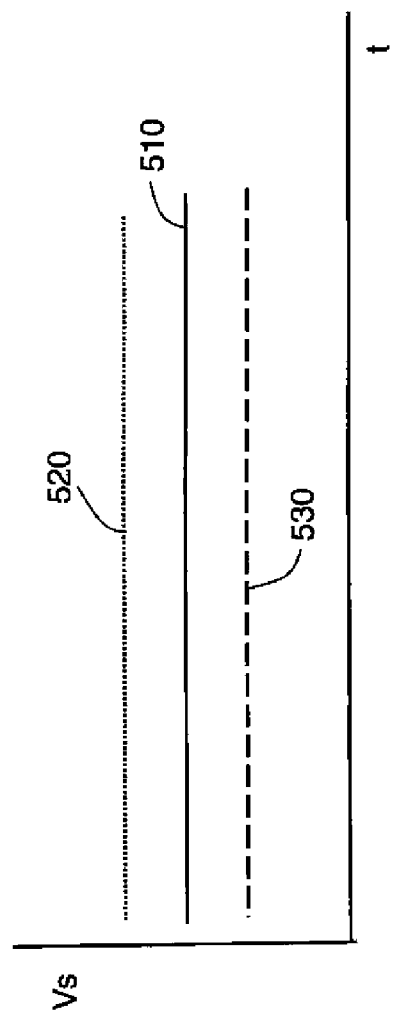
FIG. 5 is a schematic illustrating response of a light sensor when media is orientation perpendicularly to the light emission axis.

FIG. 5 shows a timing diagram for light sensor 270 response to signal V related to the distances Xa, Xb, and Xc when the total emitted power is constant and media is oriented perpendicular in respect to the light emission axis 254 (FIG. 2A). The solid line 510 shows the light sensor response time dependence Vb when media is located in the middle of the distance measuring range Xb. The lines 520 (dotted line) and 530 (dashed line) show the light sensor 270 responses Va and Vc when media is located at Xa and Xc respectively. It can be seen as well that for any moment of time tn the media to optical fiber sensor distance may be determined by the light sensor 270 response signal measured at that time tn.

When the media 256 is oriented at the angle θ to the vertical axis 255 as is depicted in FIG. 2B and in FIG. 2C, the reflected light from media 256 will change the direction of reflection by the same angle θ (dashed lines). FIG. 2B shows media deflection in a positive direction (+θ) and FIG. 2C shows media deflection in a negative direction (−θ). The deflected media orientation will cause a misbalance of reflected portions of the light received by the light sensor 270 from light source 230 and light source 240. As shown in FIG. 2B, a portion of light from the light source 230 is reflected to the light sensor and is greater than the portion of reflected light from light source 240. Consequently the reflections of the light source 230 will affect the light sensor 270 more than reflections from the light source 240, thus resulting in a light sensor response signal modulated with frequency and phase of control signal 215.

Figure 6A:
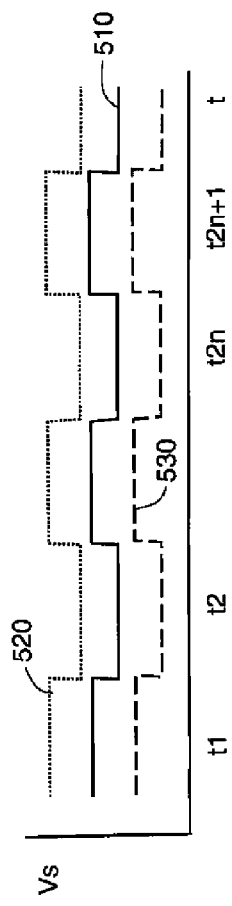
FIGS. 6A and 6B are schematics illustrating light sensor response while media orientation is non-perpendicular in respect to light emission axis.
Figure 6B:
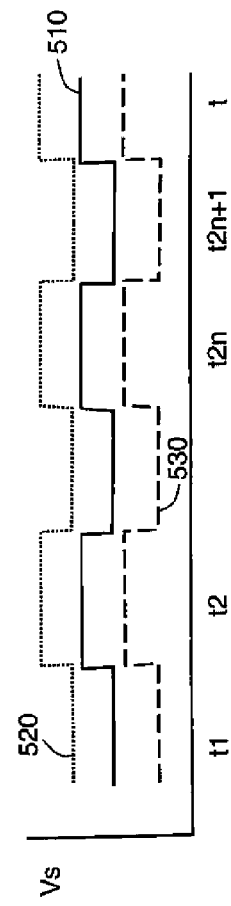

FIGS. 6A and 6B shows the light sensor 270 response behavior while light control signals 215 and 220 are modulated as described and shown by FIG. 4A, and media 256 is deflected from the vertical position 255 by the angle of (+θ). The acquisition circuitry 210 measures the light sensor 270 output signal synchronously with the modulation frequency. If media is oriented according to FIG. 2B and is aligned within the distance Xb, the measurements are performed at designated time slots denoted by t1, t2 . . . In as illustrated in FIGS. 6A and 6B by solid line 510. The measurements read at time slots t1, . . . t2n+1 (the odd time slots) will relate to the light source 230 reflections measurements, whereas the measurements read at time slots t2, . . . t2n (even time slots) will relate to the light source 240 reflections respectively thus showing the different readings due to unequal reflected portions of light coming into the light sensor 270.

If the media is shifted (moved with the same angle) to the position Xa, then due to the fact that the media deflection angle +θ is not changed, the portion of reflected from media light coming to the light sensor 270 from the light source 230 is still dominated upon the reflected light from the light source 240. But because the Xa position is closest to the optical fiber sensor 202, both of reflected portions will grow proportionally and the light sensor 270 response (dotted line 520) will be higher. Respectively the light sensor 270 response measured while media is shifted to the Xc position (dashed line 530) will be lower than measured in the middle range Xb (line 510).

If the deflection angle of media, shown on FIG. 2C, is (−θ) a portion of light from the light source 240 is reflected to the light sensor 270, and is greater than the portion of reflected light from light source 230. Consequently, the reflections of the light source 240 will affect the light sensor 270 more than reflections from the light source 230. Thus, the light sensor receives a higher portion of the signal modulated with the frequency and phase of control signal 220. The solid line 510 of FIG. 6B shows the light sensor response measured while deflected by angle (−θ) when media is located in the middle range Xb distance from the optical fiber sensor 202. As shown, the angle direction change from +θ to −θ leads to a phase change of the response signal. (The odd time slots are bigger than even ones while media is under the deflected angle +θ and the odd time slots are smaller than even ones while media is under the deflected angle −$f$).

As described above, the deflection of media by −θ degrees to positions Xa and Xc will lead to respective rising (FIG. 7B, line 520) or falling (FIG. 6B, line 530) of the response curves relative to the middle range distance response curve (FIG. 6B, line 510). This means that the same synchronous time slot measurement of light sensor 270 may be used for distance determination in spite of the media deflection. Additionally the difference between the odd and even time slot measurements or their respective relation determines the value of the deflection angle.

Figure 4B:
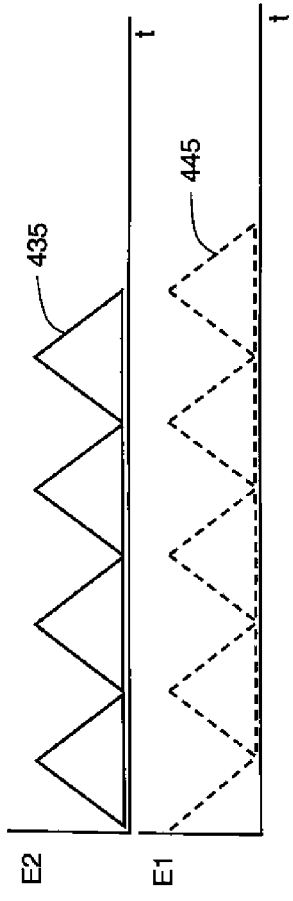
Figure 4C:
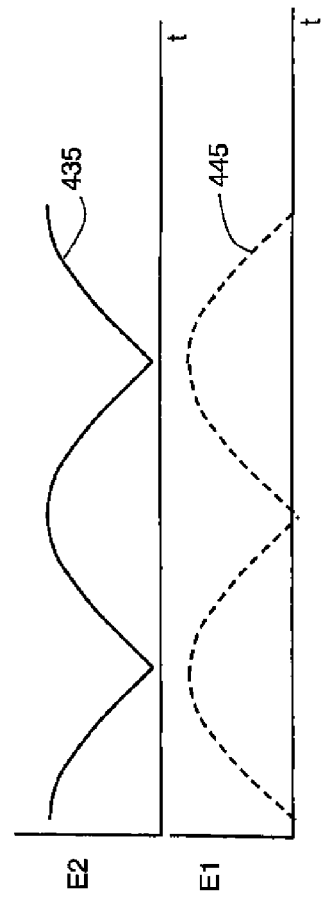

FIG. 4A shows also the other modifications of modulation signal; triangular modulation depicted on FIG. 4B and curved modulation on FIG. 4C respectively. The solid lines 435 relate to the modulation of the light source 230 and the dashed lines 445 to the modulator light source 240. The common feature of all of the modulation signals depicted in FIGS. 4A-4C can be represented by the following mathematical equation:

$$\sum_{i=1}^{n} f_i(\omega t) = const \quad (4)$$

Where i represents the index of a specific light source, and n the total number of light sources. Parameter ω is the angular frequency which indicates that modulation function is periodical.

Figure 7A:
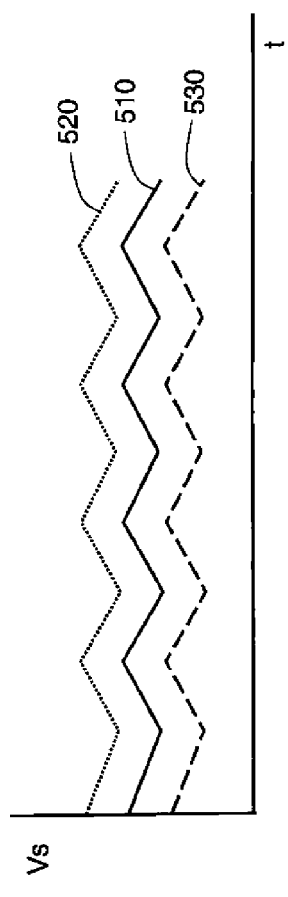
FIGS. 7A and 7B are schematics illustrating light sensor response while media orientation is non-perpendicular in respect to light emission axis.
Figure 7B:
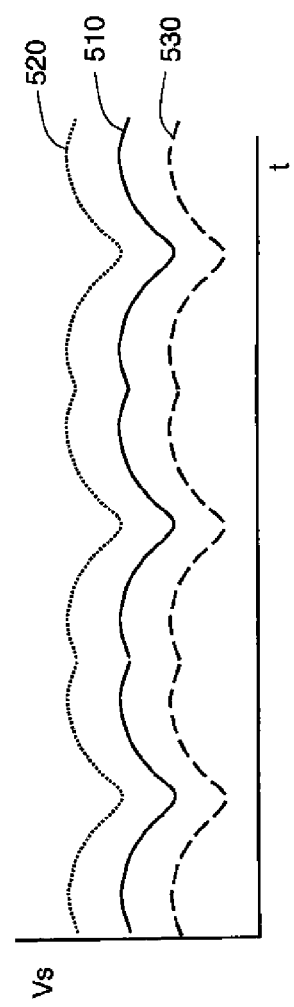

FIGS. 7A and 7B show the response curves of light sensor 270 measured while media deflected by the angle of +θ located in positions Xa, Xb, and Xc and the light source control signals 215 and 220 are generated according to triangular FIG. 4B and FIG. 4C modulation modifications. Both of these types of modulation are complied with the Equation (4).

Figure 8:
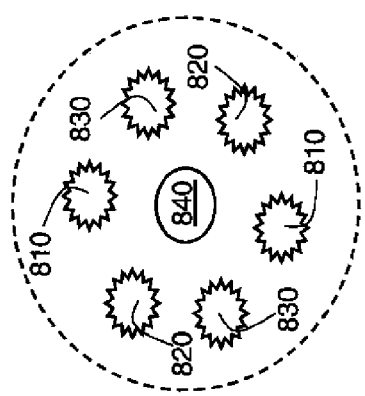
FIG. 8 is a schematic illustrating a sensor with plurality of light sources.

FIG. 8 shows the front end view of another sensor embodiment of the invention. This embodiment depicts more than two fibers used for modulation. This example describes three optic fiber pairs 810, 820 and 830 conducting light from the light sources and emitting light in three planes respectively, additionally a single optic fiber 840 is configured to conduct media reflections of reflected light to the light sensor 270. The signal generator applies control signals to each of the light sources thus providing light modulation for each fiber of the pairs 810, 820, and 830. At the same time, the control signals provide modulation such that the total emitted light energy from all optical fiber pairs will be constant. See Equation 4. In this case the acquisition circuitry measures each pair as described above, thus providing distance and angle of media. The media orientation is finally defined by superposition of each plane measurements.

The invention has been described in detail with particular reference to certain preferred embodiments thereof, but it will be understood that variations and modifications can be effected within the scope of the invention.

PARTS LIST 10 optical fiber displacement apparatus
100 light source
110 fiber
120 lens
130 media (object)
140 fiber
150 light sensor
202 optical fiber sensor
205 signal generator
210 acquisition circuitry
215 control signal
220 control signal
230 light source
235 optical fiber
240 light source
245 optical fiber
250 lens
254 light emission axis
255 vertical axis
256 media (object)
260 optical fiber
270 light sensor
301 linear range
302 point a (minimal point of the linear range)
303 point b (within the linear range)
304 point c (maximum point of the linear range)
435 modulated function for second light source
445 modulated function for first light source
510 light response for mid distance point
520 light response for maximal distance point
530 light response for minimal distance point
810 optical fiber pair
820 optical fiber pair
830 optical fiber pair
840 single optical fiber

The invention claimed is:

1. A method for measuring a distance between an object and a light source and sensing an orientation of said object comprising the steps of:
   applying light from a plurality of light sources on said object;
   detecting a reflected energy level from an object;
   measuring said reflected energy level from said object;
   computing a distance calibration function indicating relation to the distance between said object and said light source;
   determining at least one measuring range indicated by a minimum value and a maximum value within said distance calibration function;
   computing an angle calibration function indicating energy level relation sampled at predetermined time slots within periods of a modulation function; and modulating each of said plurality of light sources with said modulation function such that a total energy applied from said plurality of light sources on said object during the time of said light emission is represented by a light emission predetermined function.

2. A method as in claim 1 wherein a profile of said object is computed.

3. A method as in claim 1 further comprising:
taking a first measurement of said reflected light energy during a first part of a period of said modulation function;
taking a second measurement of said reflected light energy during a second part of said period of said modulation function; and
if said first measurement equals to said second measurement then said object is positioned perpendicular with respect to a light emission axis and said distance between said object and said light sources is derived from said first measurement or said second measurement using said distance calibration function.

4. The method of claim 3 wherein the sum of said first part period and said second part period of said modulation function equals to a period of said modulation function.

5. The method of claim 3 wherein said first part period of said modulation function equals to said second part period of said modulation function.

6. A method as in claim 1 further comprising:
taking a first measurement of said reflected light energy during a first part of a period of said modulation function;
taking a second measurement said reflected light energy during a second part of said period of said modulation function; and
if said first measurement is greater than said second measurement then the orientation angle of said object is more than 90 degrees with respect to a light emission axis and said distance between said object and said light sources is derived from the average of said first measurement and said second measurement using said distance calibration function and said orientation angle is derived from said angle calibration function.

7. A method as in claim 1 further comprising:
taking a first measurement of said reflected light energy during a first part of a period of said modulation function;
taking a second measurement said reflected light energy during a second part of said period of said modulation function; and
if said first measurement is less than said second measurement then the orientation angle of said object is less than 90 degrees in respect to the light emission axis and said distance between said object and said light sources is derived from an average of said first measurement and said second measurement using said distance calibration function and said orientation angle is derived from said angle calibration function.

8. The method of claim 1 wherein said light emission predetermined function is represented by a constant value.

9. The method of claim 1 wherein said light emission predetermined function is a periodic function.

10. The method of claim 9 wherein said periodic function is pulse modulated.

11. The method of claim 9 wherein said periodic function is triangle function.

12. The method of claim 9 wherein said periodic function is square sine function.

13. The method of claim 1 wherein said light sources are laser sources.

14. The method of claim 1 wherein said light sources are laser emission diode sources.

15. The method of claim 1 wherein said measuring range is linear.

* * * * *